July 7, 1970 A. H. DEMSKY 3,519,040
EDGE SAW
Filed July 14, 1966
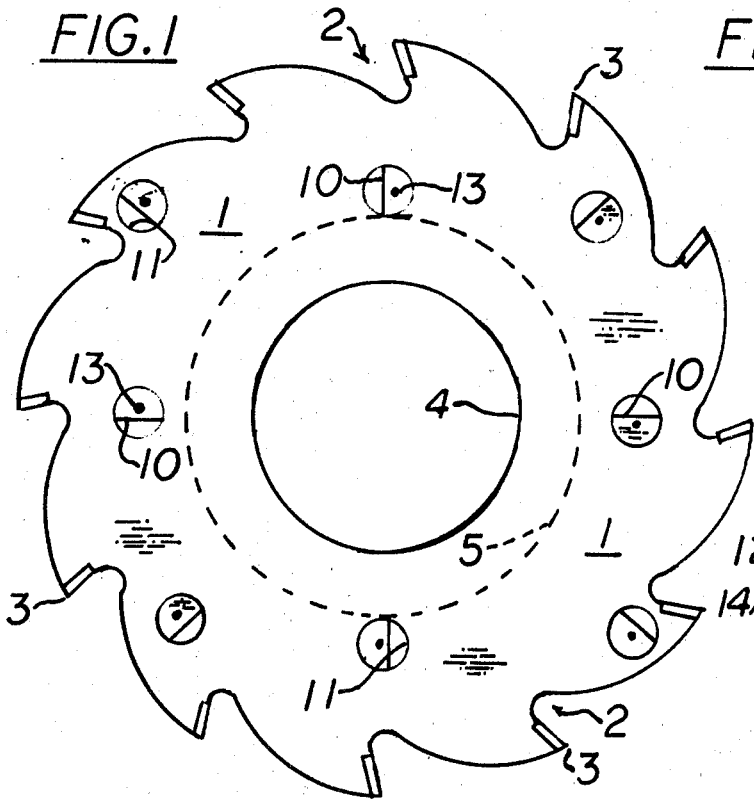
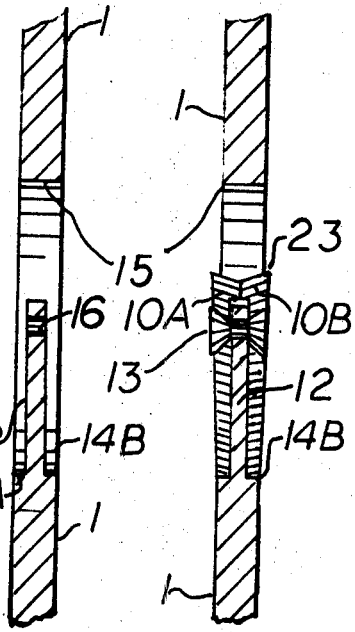
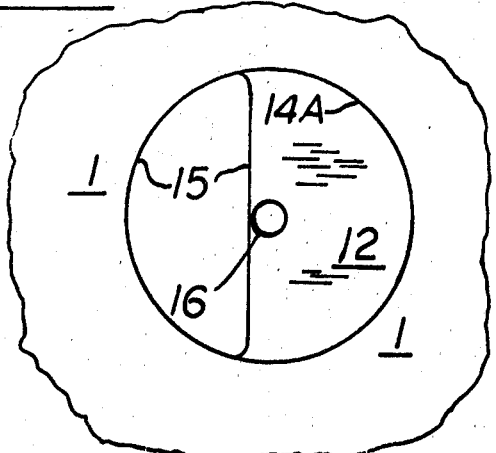
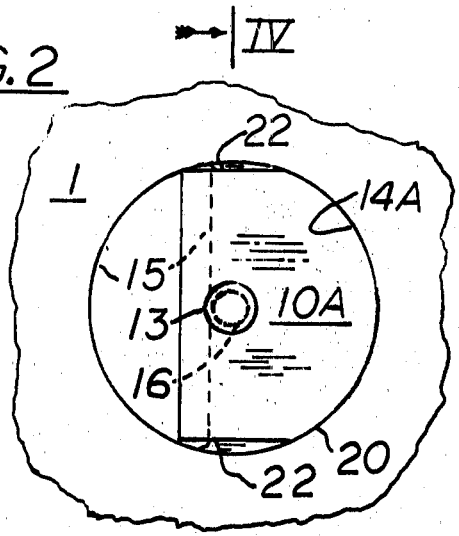
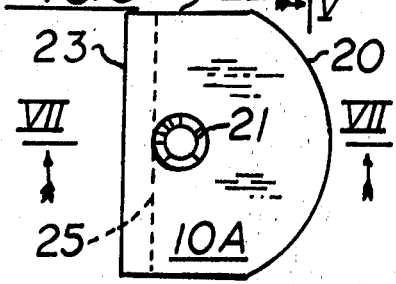
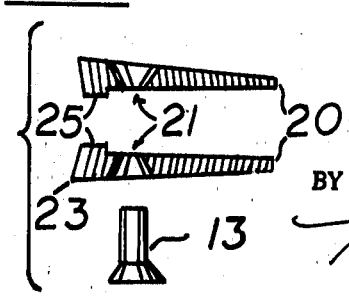
INVENTOR.
Arthur H. Demsky
BY
ATTY.

United States Patent Office 3,519,040
Patented July 7, 1970

3,519,040
EDGE SAW
Arthur H. Demsky, 12424 SE. 122nd,
Portland, Oreg. 97236
Filed July 14, 1966, Ser. No. 559,059
Int. Cl. B27b 33/08, 33/12
U.S. Cl. 143—140                                    5 Claims

ABSTRACT OF THE DISCLOSURE

An edger saw having saw teeth secured to the saw disc body about its periphery, and a plurality of angularly and radially distributed planing cutters mounted within bored out apertures on the disc body for smoothing the cut made by the saw teeth.

---

This invention relates to edger saws, or saws having planing cutters for smoothing the cut surface of the wood.

The general object of the invention is to provide a saw of the type indicated, in which the insertion and replacement of the planing cutters is accomplished at minimum cost.

In prior application of Arthur H. Demsky, Ser. No. 489,894, filed Sept. 24, 1965, for Edger Saw, a saw of this type is disclosed, and the present invention is an improvement thereon.

With the above general object in mind, as well as other objects which will appear in the course of the description, the invention will now first be fully described with reference to the accompanying drawing, and the features forming the invention will the be pointed out in the appended claims.

In the drawing, FIG. 1 is a face elevational view of the saw;

FIG. 2 is a much enlarged face elevational view showing one of the planing cutters and its mounting in the saw;

FIGS. 3 and 6 are views similar to FIG. 2, but showing, respectively, the mounting for the cutter, with the cutter removed, and the cutter; and FIGS. 4, 5 and 7 are sections on the respective lines IV—IV, V—V and VII—VII of FIGS. 2, 3 and 6, respectively.

The saw disc body 1 is peripherally notched at 2 and fitted with tungsten carbide or other teeth 3, which are brazed or otherwise secured in place in the back walls of the notches 2, as in the above-mentioned application. The disc has a central opening 4 for mounting it to a rotary drive shaft, and the dotted outline 5 indicates the profile of the disc-supporting hub or washer.

As in the application above-mentioned, a number of planing cutters 10 are provided, there being eight such cutters in the saw shown in FIG. 1, by way of example, these cutters being spaced around the disc in angular positions differing by 45° and also being spaced radially so as to cover, as a group, the entire annular space from the profile 5 of the washer or hub element to the cutting teeth 3. The cutters 10, in the saw shown, form two sets or groups: the cutters in the 12 o'clock, 1:30, 3:00 and 4:30 positions forming one group, while the four cutters positioned symmetrically to them with respect to the disc axis, form a second group. The first, third, second and fourth cutters of the group cut successive touching, or slightly overlapping annular areas, spanning the entire distance from line 5 to the peripheral cutting tooth elements 3, so that the entire face of the cut is planed smooth.

While the invention is shown as embodied in a saw having twelve peripheral cutting teeth and eight planing cutters divided into two groups of four each, the invention is not limited to any particular numbers of teeth, cutters or groups. The size of planing cutter element is selected so as to be convenient, a cutter 10 with about a half inch cutting edge being generally suitable.

FIGS. 2 and 4 show the planing cutter 10 in position in the disc aperture 11 in which it is mounted. The cutter is formed in two matching halves 10A and 10B fitting against the opposite faces of a web element 12 and secured to it and to each other by means of a rivet (or hollow set screw) 13.

The holding aperture construction is shown most clearly in FIGS. 3 and 5. The disc body 1 is bored about one third of the way through from both faces, as at 14A and 14B and the web 12 which is left is routed out as at 15 so that the edge of the web 12 is spaced far enough from the center of the aperture to accommodate the small central bore 16, which takes the rivet 13, previously mentioned. In forming the apertures, the blank may be rotatively supported on a vertical arbor and indexed in 45° steps. Bores 16 serve to center the drill or countersink which forms the bores 14A and 14B and the routing 15 has the same relation to a radius from the disc axis through the center of bore 16, in all cases. It is therefore very easy to produce the apertures closely identical to each other and located accurately on the disc.

The elements designated as 10A and 10B are, in the construction shown, actually identical. Each has a circular border 20, concentric about the axis of bore 21 which takes the rivet 13, and occupying about 120° of arc. To each side of the arc 20, the element has flats 22 (which lie chordwise of bores 14A and 14B), flanking the straight cutting edge 23 of the element. Adjacent arc 20 the element 10A (10B) is about as thick as bore 14A (14B) is deep so as to be substantially flush with the face of the disc 1. From here the element tapers out or thickens, so that the cutting edge 23 is set out from the disc face by the desired amount. Beyond the web 12 the element is formed with a rib 25, protruding about half the thickness of the web 12, so that the ribs 25 of elements 10A and 10B abut, forming a solid cutter element surface between their two edges 23.

The elements 10 are typically formed by powder metallurgy and of tungsten carbide or other very hard material. It is apparent that the shape is well adapted to manufacture by molding and that the stress distribution in use is advantageous. The fact that all elements 10 are identical and that they are riveted in place makes installation, removal and replacement as simple and economical as possible.

In replacing a planing cutter, the rivet 13 is drilled or punched out and elements 10A and 10B are removed. New elements 10A and 10B and a new rivet 13 are now put in place and the rivet is upset to hold the cutter elements securely against the web 12. The edge of ridge 25, extending along the adjacent edge of web 12, locates the cutter element angularly and holds it in angular position thereafter.

What is claimed is:
1. An edger saw comprising:
   a disc body having a central opening for shaft mounting the saw and a notched periphery.
   a saw tooth secured to the back edges of each of said notches,
   a plurality of radially spaced apertures disposed symmetrically about a diametrical axis of said disc body, each said aperture comprising aligned bores extending partially through the disc body from each face thereof over an area of more than half the aperture and extending entirely through the disc body over the remaining area of the aperture so as to leave a web element, said web having a bore which comprises the center of said aperture, a cutter supported on said web within said aperture comprising identical opposed halves, each said half comprising a wedged shaped disc having a circular border, a pair of flat parallel borders on either side of said circular border and a cutting edge opposite said circular border and connecting said flat borders, the thickness of said wedge at the circular border being equal to the bored out section of said aperture between the surface of said saw disc body and the said web, the thickness of said wedge at the cutting edge being greater than one half the thickness of said saw disc body, the length of said disc from the said circular border to said cutting edge being greater than the corresponding length of said web, said pair of wedges forming said cutter being supported by said web in the aperture by means of a rivet passing through each of said halves and said central bore of said web, whereby the said wedge disc fits flush with both surfaces of the saw disc body at the circular border and the cutting edges located over the bored out portion of the aperture which extends entirely through said disc body, said wedge being located in said aperture with said cutting edge located substantially radial and extending over the surface of said disc body.

2. The edger saw according to claim 1 wherein said cutting edges of said pair of wedge discs have thickened ridges adjacent thereto which abut against each other in the bored through portion of said aperture when said wedges are supported therein, thereby forming a solid cutter element between the cutter edges.

3. An edger saw comprising a disc body having a central opening and surrounding hub for shaft mounting the saw and a notched periphery with saw teeth on the back edges of said notches, a plurality of cutter elements mounted within apertures radially spaced between hub and the saw disc body periphery so that said cutter elements cover the entire annular space between said opening and said periphery, said aperture being disposed symmetrically about a diametrical axis of said saw body, said aperture comprising a bored out section extending partially through said body over more than half the aperture area and entirely through the disc body over the remaining area of the aperture, the unbored portion of the aperture having a second bore which comprises the center of said apertures, said cutter element comprising a wedge shaped disc having a circular border and a cutting edge, the thickness of said wedge at said circular border being equal to the depth of the partial bore and the thickness of said cutting edge being greater than the depth of bore so that when said cutting element is fit in said aperture the said circular border fits flush with the surface of said saw disc body and said cutting edge extends beyond the surface of said saw disc body, said cutting edge of said cutting element being located over the bored through portion of said aperture and radially aligned with respect to said saw disc body, said cutting element being secured within said aperture by means of a rivet passing through said second bore and said cutting element.

4. A circular saw blade structure comprising:
(a) peripheral cutting teeth,
(b) a friction relief insert comprising a pair of plate-like body portions,
(c) means in said saw blade defining an aperture disposed inwardly from the periphery of said blade,
(d) said aperture being defined in part by a wall on the trailing side of the aperture with regard to the direction of rotation of the saw blade,
(e) means on said saw blade defining recess portions on opposed surfaces thereof,
(f) said recess portions leading from the said wall of the aperture and extending away from the latter in a trailing direction with regard to the direction of rotation of the saw blade,
(g) said recess portions terminating at the trailing ends thereof in defining walls,
(h) said body portions having a head on one end thereof a cutting edge portion of which is arranged to project outwardly from the surface of the blade a greater distance than said body portion,
(i) said body portions terminating in an edge at the end opposite from said heads,
(j) the heads of the insert having inwardly directed extensions which form shoulder portions on said heads,
(k) the heads of said insert being disposed in the plane of said aperture and the inwardly directed extensions thereof extending into said aperture toward each other and being disposed in abutting relation with each other,
(l) the body portions of said insert being seated in said recess portions with said shoulders being in bearing engagement with the said wall of the aperture and with the said edges which are at the end opposite from the said heads being in engagement with the defining walls at the trailing ends of said recesses,
(m) and means for securing said two body portions in respective recesses.

5. An edger saw comprising:
a disc body having a central opening for shaft mounting the saw and a notched periphery;
a saw tooth carried on the back edges of each of said notches;
a plurality of radially spaced substantially circular apertures disposed symmetrically about a diametrical axis of said disc body each said aperture comprising aligned bores from each face of the saw disc body;
said apertures having a rearward portion, with respect to the direction of rotation of the saw, where the bore extends partially through the disc body over an area of more than half the aperture and a forward portion where the bore extends entirely through the disc body over the remaining area of the aperture so as to leave a web element defined by said partially extending portions of said bore, said web element occupying the rearward portion of said aperture;
said web element having a bore which comprises the center of said aperture;
a cutter supported on said web within said aperture comprising identical opposed halves, each said half comprising a wedged shaped disc having a circular border, and a cutting edge opposite said circular border, the thickness of said wedge at the circular border opposite said cutting edge being equal to the bored out section of said aperture between the surface of said saw disc body and the said web, the thickness of said wedge at the cutting edge being greater than one half the thickness of said saw disc body, the length of said wedge-shaped disc from the said circular border opposite said cutting edge to said cutting edge being greater than the corresponding length of said web;
said pair of wedges forming said cutter being supported by said web in the aperture by means of a rivet passing through each of said halves and said central bore of said web, said wedges having their inner waces engaging the outer surfaces of said web when so supported and pressed against said web by said rivet;
said circular border of said wedge engaging the rearward edge of said partially bored through portion of said aperture and said cutting edge being located over the forward portion of said aperture where said bore extends entirely through said saw disc body;
said pair of wedge discs having thickened ridges adjacent said cutting edges which abut against each other in the bored through portion of said aperture when said wedges are supported therein, thereby forming a solid cutter element between the cutting edges;

whereby the said wedge disc fits flush with the surface of the saw disc body at the rearward circular border and the cutting edges located over the bored out portion of the aperture which extends entirely through said disc body extends beyond the surface of the disc body, said wedge being located in said aperture with said cutting edge located substantially radial and as a group extending substantially across the entire surface of said disc body.

References Cited

UNITED STATES PATENTS

| | | | |
|---|---|---|---|
| 60,827 | 1/1867 | Bee | 143—143 |
| 342,535 | 5/1886 | Perkins | 143—143 |
| 2,659,398 | 11/1953 | Marvin | 143—140 |

FOREIGN PATENTS 20,025   3/1915   Denmark.

DONALD R. SCHRAN, Primary Examiner

U.S. Cl. X.R.

143—143